United States Patent
Lei et al.

(10) Patent No.: US 10,193,681 B2
(45) Date of Patent: Jan. 29, 2019

(54) METHOD, APPARATUS AND COMPUTER PROGRAM FOR WIRELESS COMMUNICATIONS

(71) Applicant: Nokia Solutions and Networks Oy, Espoo (FI)

(72) Inventors: Haipeng Lei, Beijing (CN); Chunhai Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 8 days.

(21) Appl. No.: 14/889,190

(22) PCT Filed: May 9, 2013

(86) PCT No.: PCT/CN2013/075380
§ 371 (c)(1),
(2) Date: Nov. 5, 2015

(87) PCT Pub. No.: WO2014/179958
PCT Pub. Date: Nov. 13, 2014

(65) Prior Publication Data
US 2016/0149687 A1 May 26, 2016

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1861* (2013.01); *H04L 5/14* (2013.01);
(Continued)

(58) Field of Classification Search
None
See application file for complete search history.

(56) References Cited

U.S. PATENT DOCUMENTS

2012/0314674 A1* 12/2012 Seo ............. H04L 1/1861
370/329
2015/0318974 A1* 11/2015 Hou ............ H04W 72/0406
370/280
2015/0358998 A1* 12/2015 Golitschek Edler Von
Elbwart ........ H04W 48/16
370/280

FOREIGN PATENT DOCUMENTS

CN 101978636 A 2/2011
CN 102740330 A 10/2012
(Continued)

OTHER PUBLICATIONS

Alcatel-Lucent Shanghai Bell, Alcatel-Lucent, "Discussion on HARQ and UL-Grant timing with Dynamic TDD UL-DL configuration", 3GPP TSG RAN WG1 Meeting #68bis, Jeju, Korea, Mar. 26-30, 2012, R1-121260.*
(Continued)

*Primary Examiner* — Joseph A Bednash
(74) *Attorney, Agent, or Firm* — Harrington & Smith (57) ABSTRACT

A method for configuring a Time Division Duplex (TDD) mode of a user equipment (UE) in a Long Term Evolution (LTE) network, including receiving, while being connected with an enhanced NodeB (eNodeB) in said LTE network, a signaling message that includes TDD uplink-downlink configuration information dynamically assigned by said enhanced NodeB (eNodeB) to said UE; determining success or failure in receiving at said UE, said TDD uplink-downlink configuration information based on signaling information configured for said signaling message; generating an acknowledgement (ACK)/Non-acknowledgement (NACK) signal indicating said success or failure; and transmitting said ACK/NACK signal to said eNodeB on resources that are allocated based on said TDD uplink-downlink configu- (Continued)

ration information and/or said signaling configured for said signaling message.

20 Claims, 6 Drawing Sheets

(51) Int. Cl.
    *H04L 5/14*       (2006.01)
    *H04W 16/10*    (2009.01)
    *H04W 48/00*    (2009.01)
    *H04W 72/04*    (2009.01)
    *H04W 72/08*    (2009.01)

(52) U.S. Cl.
    CPC ........... *H04W 16/10* (2013.01); *H04W 48/00* (2013.01); *H04W 72/0446* (2013.01); *H04W 72/082* (2013.01); *H04W 72/04* (2013.01)

(56) References Cited

FOREIGN PATENT DOCUMENTS

CN         102958058 A    3/2013
WO       WO2014166515 A   10/2014

OTHER PUBLICATIONS

3GPP TS 36.213 V11.1.0 (Dec. 2012), Technical Specification, 3rd Generation Partnership Project; Technical Specification Group Radio Access Network; Evolved Universal Terrestrial Radio Access (E-UTRA); Physical Layer procedures (Release 11); pp. 82-93.*

3GPP TS 36.213 V11.1.0 (Dec. 2012-12); "3rd Generation Partnership Project; Technical Specification Group Radio Access Network; Evolved Universal Terrestrial Radio Access (E-UTRA); Physical layer procedures (Release 11)"; Dec. 20, 2012; pp. 82-93 and 136-150.*

CATT: "Signalling Mechanisms for TDD UL-DL Reconfiguration" 3GPP Draft; R1-130980, 3rd Generation Partnership Project (3GPP), Mobile Competence Centre; 650, Route Des Lucioles; F-06921 Sophia-Antipolis Cedex; France, vol. Ran WG1, No. Chicago, USA; Apr. 15, 2013-Apr. 19, 2013, Apr. 6, 2013, XP050696973, Retrieved from the Internet: URL: http://www.3gpp.org/ftp/tsg_ran/WG1_RL1/TSGR1_72b/Docs/[retrieved on Apr. 6, 2013].

3GPP TSG RAN WG1 Meeting #64, Taipei, Taiwan, Feb. 21-25, 2011, R1-110841, "Resource Allocation for TDD PUCCH format 3" LG Electronics, 5 pgs.

3GPP TSG-RAN WG1 Meeting #72 bis, Chicago, USA, Apr. 15-19, 2013, R1-131223, "Discussion on Signalling support for the indication of dynamic TDD UL/DL reconfiguration", Nokia Siemens Networks, Nokia, 4 pgs.

3GPP TSG RAN WG1 Meeting #72 R1-130293 St Julian's, Malta, Jan. 28-Feb. 1, 2013; Source: Samsung Title: Signaling methods for TDD UL-DL reconfiguration.

3GPP TSG RAN WG1 Meeting #72 R1-130422 St Julian's, Malta, Jan. 28-Feb. 1, 2013; Source: Renesas Mobile Europe Ltd Title: Discussion on signaling mechanisms for TDD UL-DL reconfiguration.

3GPP TSG RAN WG1 Meeting #72bis R1-130916 Chicago, USA, Apr. 15-19, 2013 Source: Intel Corporation Title: Discussion on Signalling Mechanisms for TDD UL-DL Reconfiguration.

3GPP TSG RAN WG1 Meeting #72bis R1-131012 Chicago, USA, Apr. 15-Apr. 19, 2013 Source: Samsung Title: Signaling for TDD UL-DL Reconfiguration.

3GPP Tsg Ran WG1 Meeting #72bis R1-131326 Chicago, USA, Apr. 15-19, 2013 Source: Panasonic Title: Signalling mechanisms for TDD UL-DL reconfiguration.

* cited by examiner

| SUBFRAME NUMBER | 7 | 8 | 9 | 0 | 1 | 2 | 3 | 4 | 5 | 6 | 7 | 8 |
|---|---|---|---|---|---|---|---|---|---|---|---|---|
| UL/DL CONFIGURATION 0: 1DL:1ST:3UL (7 PROCESSES) | | | | | | | | | | | | |
| SUBFRAME | U | U | U | D | S | U | U | U | D | S | U | U |
| ASS. PHICH | 1 | 2 | 3 | P67 | P1 | 4 | 5 | 6 | P23 | P4 | 7 | 1 |
| GRANT LOCATION | 1 | 2 | 3 | G67 | G71 | 4 | 5 | 6 | G23 | G4 | 7 | 1 |
| UL/DL CONFIGURATION 1: 2DL:1ST:2UL (4 PROCESSES) | | | | | | | | | | | | |
| SUBFRAME | U | U | D | D | S | U | U | D | D | S | U | U |
| ASS. PHICH | 1 | 2 | P4 | | P1 | 3 | 4 | P2 | | P2 | 1 | 2 |
| GRANT LOCATION | 1 | 2 | G4 | | G1 | 3 | 4 | G2 | | G2 | 1 | 2 |
| UL/DL CONFIGURATION 2: 3DL:1ST:1UL (2 PROCESSES) | | | | | | | | | | | | |
| SUBFRAME | U | D | D | D | S | U | D | D | D | S | U | D |
| ASS. PHICH | 1 | P2 | | | | 2 | P1 | | | | 1 | P2 |
| GRANT LOCATION | 1 | G2 | | | | 2 | G1 | | | | 1 | G2 |
| UL/DL CONFIGURATION 3: 6DL:1ST:3UL (3 PROCESSES) | | | | | | | | | | | | |
| SUBFRAME | D | D | D | D | S | U | U | U | D | D | D | D |
| ASS. PHICH | | P1 | P2 | P3 | | 1 | 2 | 3 | | | | P1 |
| GRANT LOCATION | | G1 | G2 | G3 | | 1 | 2 | 3 | | | | G1 |
| UL/DL CONFIGURATION 4: 7DL:1ST:2UL (2 PROCESSES) | | | | | | | | | | | | |
| SUBFRAME | D | D | D | D | S | U | U | D | D | D | D | D |
| ASS. PHICH | | P1 | P2 | | | 1 | 2 | | | | | P1 |
| GRANT LOCATION | | G1 | G2 | | | 1 | 2 | | | | | G1 |
| UL/DL CONFIGURATION 5: 8DL:1ST:1UL (1 PROCESSES) | | | | | | | | | | | | |
| SUBFRAME | D | D | D | D | S | U | D | D | D | D | D | D |
| ASS. PHICH | | P1 | | | | 1 | | | | | | P1 |
| GRANT LOCATION | | G1 | | | | 1 | | | | | | G1 |
| UL/DL CONFIGURATION 6: 2DL:1ST:2UL:1DL:1ST:3UL (6 PROCESSES) | | | | | | | | | | | | |
| SUBFRAME | U | U | D | D | S | U | U | U | D | S | U | U |
| ASS. PHICH | 1 | 2 | P5 | P6 | P1 | 3 | 4 | 5 | P2 | P3 | 6 | 1 |
| GRANT LOCATION | 1 | 2 | G5 | G6 | G1 | 3 | 4 | 5 | G2 | G3 | 6 | 1 |

| FIG.6A | FIG.6B | FIG.6C |

FIG. 6

| | | 418↙ | | ↙420 | | | | | | | | | | | | |
|---|---|---|---|---|---|---|---|---|---|---|---|---|---|---|---|---|
| 9 | 0 | 1 | 2 | 3 | 4 | 5 | 6 | 7 | 8 | 9 | 0 | 1 | 2 | 3 | 4 | 5 | 6 |

| U | D | S | U | U | U | D | S | U | U | U | D | S | U | U | U | D | S |
|---|---|---|---|---|---|---|---|---|---|---|---|---|---|---|---|---|---|
| 2 | P24 | P7 | 3 | 4 | 5 | P12 | P3 | 6 | 7 | 1 | P45 | P6 | 2 | 3 | 4 | P71 | P2 |
| 2 | G24 | G67 | 3 | 4 | 5 | G12 | G23 | 6 | 7 | 1 | G45 | G56 | 2 | 3 | 4 | G71 | G12 |

| D | D | S | U | U | D | D | S | U | U | D | D | S | U | U | D | D | S |
|---|---|---|---|---|---|---|---|---|---|---|---|---|---|---|---|---|---|
| P4 |  | P1 | 3 | 4 | P2 |  | P3 | 1 | 2 | P4 |  | P1 | 3 | 4 | P2 |  | P3 |
| G4 |  | G1 | 3 | 4 | G2 |  | G3 | 1 | 2 | G4 |  | G1 | 3 | 4 | G2 |  | G3 |

| D | D | S | U | D | D | D | S | U | D | D | D | S | U | D | D | D | S |
|---|---|---|---|---|---|---|---|---|---|---|---|---|---|---|---|---|---|
|  |  | 2 |  |  |  |  |  | 1 | P2 |  |  |  | 2 | P1 |  |  |  |
|  |  | 2 |  |  |  |  |  | 1 | G2 |  |  |  | 2 | G1 |  |  |  |

| D | D | S | U | U | U | D | D | D | D | D | D | S | U | U | U | D | D |
|---|---|---|---|---|---|---|---|---|---|---|---|---|---|---|---|---|---|
| P1 | P3 |  | 1 | 2 | 3 |  |  |  | P1 | P2 | P3 |  | 1 | 2 | 3 |  |  |
| G1 | G3 |  | 1 | 2 | 3 |  |  |  | G1 | G2 | G3 |  | 1 | 2 | 3 |  |  |

| D | D | S | U | U | D | D | D | D | D | D | D | S | U | U | D | D | D |
|---|---|---|---|---|---|---|---|---|---|---|---|---|---|---|---|---|---|
| P2 |  |  | 1 | 2 |  |  |  |  | P1 | P2 |  |  | 1 | 2 |  |  |  |
| G2 |  |  | 1 | 2 |  |  |  |  | G1 | G2 |  |  | 1 | 2 |  |  |  |

| D | D | S | U | D | D | D | D | D | D | D | D | S | U | D | D | D | D |
|---|---|---|---|---|---|---|---|---|---|---|---|---|---|---|---|---|---|
|  |  |  | 1 |  |  |  |  |  | P1 |  |  |  | 1 |  |  |  |  |
|  |  |  | 1 |  |  |  |  |  | G1 |  |  |  | 1 |  |  |  |  |

| D | D | S | U | U | U | D | S | U | U | D | D | S | U | U | U | D | S |
|---|---|---|---|---|---|---|---|---|---|---|---|---|---|---|---|---|---|
| P4 | P5 | P6 | 2 | 3 | 4 | P1 | P2 | 5 | 6 | P3 | P4 | P5 | 1 | 2 | 3 | P6 | P1 |
| G4 | G5 | G6 | 2 | 3 | 4 | G1 | G2 | 5 | 6 | G3 | G4 | G5 | 1 | 2 | 3 | G6 | G1 |

FIG.6B

| 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|
| U | U | U | D | S | U | U | U | D | S | U | U | U | D | S |
| 5 | 6 | 7 | P34 | P5 | 1 | 2 | 3 | P67 | P1 | 4 | 5 | 6 | P23 | P4 |
| 5 | 6 | 7 | G34 | G45 | 1 | 2 | 3 | G67 | G71 | 4 | 5 | 6 | G23 | G34 |

| U | U | D | D | S | U | U | D | D | S | U | U | D | D | S |
|---|---|---|---|---|---|---|---|---|---|---|---|---|---|---|
| 1 | 2 | P4 |  | P1 | 3 | 4 | P2 |  | P3 | 1 | 2 | P4 |  | P1 |
| 1 | 2 | G4 |  | G1 | 3 | 4 | G2 |  | G3 | 1 | 2 | G4 |  | G1 |

| U | D | D | D | S | U | D | D | D | S | U | D | D | D | S |
|---|---|---|---|---|---|---|---|---|---|---|---|---|---|---|
| 1 | P2 |  |  |  | 2 | P1 |  |  |  | 1 | P2 |  |  |  |
| 1 | G2 |  |  |  |  | G1 |  |  |  |  | G2 |  |  |  |

| D | D | D | D | S | U | U | U | D | D | D | D | D | D | S |
|---|---|---|---|---|---|---|---|---|---|---|---|---|---|---|
|  | P1 | P2 | P3 |  | 1 | 2 | 3 |  |  | P1 | P2 | P3 |  |  |
|  | G1 | G2 | G3 |  |  |  |  |  |  | G1 | G2 | G3 |  |  |

| D | D | D | D | S | U | U | D | D | D | D | D | D | D | S |
|---|---|---|---|---|---|---|---|---|---|---|---|---|---|---|
|  | P1 | P2 |  |  | 1 | 2 |  |  |  |  | P1 | P2 |  |  |
|  | G1 | G2 |  |  | 1 | 2 |  |  |  |  | G1 | G2 |  |  |

| D | D | D | D | S | U | D | D | D | D | D | D | D | D | S |
|---|---|---|---|---|---|---|---|---|---|---|---|---|---|---|
|  | P1 |  |  |  | 1 |  |  |  |  |  | P1 |  |  |  |
|  | G1 |  |  |  | 1 |  |  |  |  |  | G1 |  |  |  |

| U | U | D | D | S | U | U | D | D | S | U | U | D | D | S |
|---|---|---|---|---|---|---|---|---|---|---|---|---|---|---|
| 5 | 6 | P2 | P3 | P4 | 6 | 1 | 2 | P5 | P6 | 3 | 4 | P1 | P2 | P3 |
| 5 | 6 | G2 | G3 | G4 | 6 | 1 | 2 | G5 | G6 | 3 | 4 | G1 | G2 | G3 |

FIG.6C

METHOD, APPARATUS AND COMPUTER PROGRAM FOR WIRELESS COMMUNICATIONS

This disclosure relates to wireless communications and more particularly to downlink and uplink re-configurations in Long Term Evolution (LTE) Time Division Duplex (TDD) systems.

Figure 1:
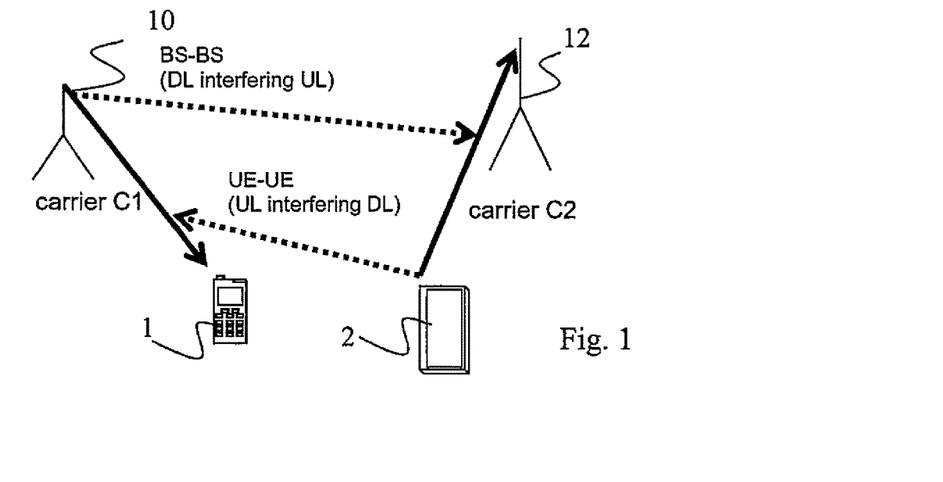
FIG. 1 shows a schematic diagram of a communication system where the invention may be embodied.

A wireless communication system can be seen as a facility that enables wireless carriers between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate, how various aspects of the communications shall be implemented and how the devices shall be configured. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics. FIG. 1 shows a schematic example of a system comprising two base stations and two devices in communication with the base stations.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobility for users where a mobile device can communicate over an air interface with another communication device such as e.g. a base station and/or other user equipment.

Examples of mobile communication systems are those based on standards by the 3rd Generation Partnership Project (3GPP). A recent 3GPP development is often referred to as the long-term evolution (LTE) of the Universal Mobile Telecommunications System (UMTS) radio-access technology. The various development stages of the 3GPP LTE specifications are referred to as releases. In LTE base stations are commonly referred to as enhanced NodeBs (eNodeB).

Figure 2:
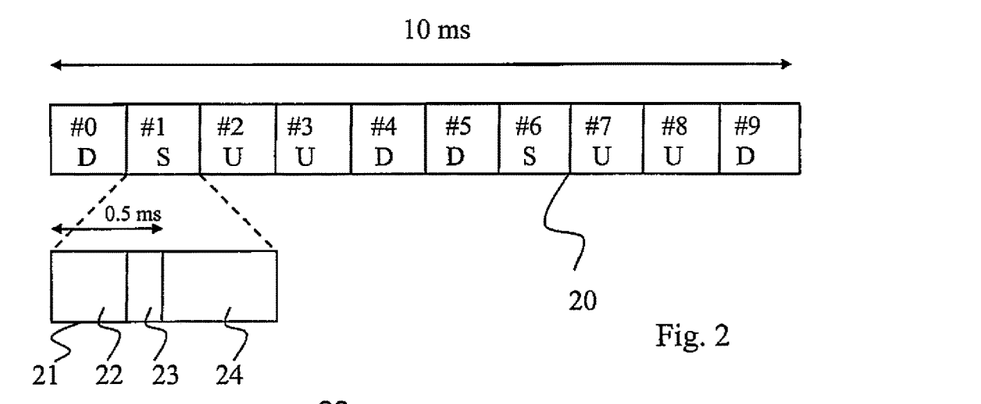
FIG. 2 shows a radio frame.

LTE provides frequency division duplex (FDD) and time division duplex (TDD) modes for wireless communications. The FDD mode uses a paired spectrum where the frequency domain is used to separate the uplink (UL) and downlink (DL) transmission. In TDD systems, an unpaired spectrum may be used where both UL and DL are transmitted over the same carrier frequency. The UL and DL are separated in the time domain. In LTE TDD physical layer the uplink and downlink are divided into 10 ms long radio frames. FIG. 2 illustrates an exemplary radio frame structure 20 for LTE time division duplex (TDD). A LTE TDD radio frame is divided into timeslots where two consecutive slots form one subframe. Thus each frame can be understood as being divided into ten 1 ms subframes #0-#9. Within a radio frame, LTE TDD can switch multiple times between downlink and uplink transmission and vice versa. However, uplink (UL) transmission may interfere with the downlink (DL) and vice versa. An example for uplink and downlink (UL-DL) interference is shown in FIG. 1 (note that carriers C1 and C2 can comprise a single carrier). Such interference can be an important limiting factor to flexible UL-DL allocation. Critical control information, non-limiting examples of which include secondary synchronization signal (SSS), physical broadcast channel (PBCH), system information, paging information, and random access channel (RACH) response message transmitted over Physical Downlink Shared Channel (PDSCH) with DL grant on Physical Downlink Control Channel (PDCCH), Cell-specific reference signal (CRS) and/or channel state information reference signal (CSI-RS), UL control information transmitted on Physical Uplink Control Channel (PUCCH)/Physical Uplink Shared Channel (PUSCH) and dynamic broadcast channel (BCH) carrying system information blocks (SIBs) can become exposed to severe interference if one or more neighbouring cells is/are in opposite direction in the same subframe.

In general, loss of critical control information may even prevent the whole system from working. To ensure reliability control information should be communicated in a time period when neighbouring cells have the same UL-DL direction. This is known as a protected time period.

Communication in radio frames can be switched between uplink and downlink subframes. Switching from the downlink to the uplink can be provided on a subframe commonly referred to as a special subframe, denoted by "S" in FIG. 2. A special subframe comprises Downlink Pilot Timeslot (DwPTS) 22 and Uplink Pilot Timeslot (UpPTS) fields 24. A guard period (GP) 23 is provided between the downlink and uplink pilots.

In a first aspect there is provided a method for configuring a Time Division Duplex (TDD) mode of a user equipment (UE) in a Long Term Evolution (LTE) network, comprising: receiving, while being connected with an enhanced NodeB (eNodeB) in said LTE network, a signaling message that includes TDD uplink-downlink configuration information dynamically assigned by said enhanced NodeB (eNodeB) to said UE; determining success or failure in receiving at said UE, said TDD uplink-downlink configuration information based on signaling information configured for said signaling message; generating an acknowledgement (ACK)/Non-acknowledgement (NACK) signal indicating said success or failure; and transmitting said ACK/NACK signal to said eNodeB on resources that are allocated based on said TDD uplink-downlink configuration information and/or said signaling configured for said signaling message.

Preferably said receiving and/or said transmitting are performed through Media Access Control (MAC) and/or Physical Layer (PHY) signaling.

Preferably said signaling message is a common signaling message intended to a group of UEs that communicate with said eNodeB in a common manner.

Preferably Physical Uplink Control Channel (PUCCH) format 3 is configured for said transmitting.

Preferably the method comprises receiving said TDD uplink-downlink configuration information in multiple downlink subframes of a radio frame from said eNodeB; generating corresponding ACK/NACK signals, in a order of said receiving, indicating success or failure in receiving said TDD uplink-downlink configuration information at said UE; and transmitting said corresponding ACK/NACK signals, respectively, to said eNodeB.

Preferably the method comprises mapping said corresponding ACK/NACK signals for explicit TDD UL-DL configuration indication received to one or more fixed positions for said transmitting.

Preferably PUCCH format 1b with channel selection is configured for said transmitting.

Preferably a UE-specific PUCCH resource is configured by radio resource control (RRC) signaling and used for said transmitting.

Preferably the method comprises transmitting said ACK/NACK signal on said UE-specific PUCCH resource if no Physical Downlink Control Channel with assigned Physical Downlink Shared Channel (PDSCH) is detected in a same downlink (DL) subframe of said signaling message.

Preferably the method comprises if Physical Downlink Control Channel with assigned PDSCH is detected in a same DL subframe of said signaling message, using ACK/NACK bundling to generate one ACK/NACK bit for said DL subframe and transmit said one ACK/NACK bit on implicit PUCCH resource derived by lowest Control Channel Element (CCE) index of Downlink Control Information (DCI) scrambled by Cell Radio Network Temporary Identifier (C-RNTI).

Preferably said signaling message is a dedicated signaling message.

Preferably the method comprises receiving said signaling message using DL Semi-Persistent Scheduling Activation or Release signalling.

Preferably the method comprises validate a Semi-Persistent Scheduling assignment of said DL Semi-Persistent Scheduling Activation or Release signalling.

Preferably the method comprises detecting said TDD uplink-downlink configuration information using DCI format information of said DL Semi-Persistent Scheduling Activation or Release signalling.

Preferably said TDD uplink-downlink configuration information is indicated by re-using one or more special fields in said DCI format.

Preferably the method comprises detecting UL-DL reference configuration using DCI format information of said DL Semi-Persistent Scheduling Activation or Release signalling.

Preferably said UL-DL reference configuration information is directly indicated by re-using one or more special fields in said DCI format, or indirectly indicated in said DCI format by indicating a set of UL-DL reconfigurations.

Preferably said one or more special fields comprise Modulation and Coding Scheme (MCS) and/or Redundancy Version (RV) field of DCI format 1A and/or Cyclic shift DM RS field of DCI format 0.

In a second aspect there is provided a method for configuring a Time Division Duplex (TDD) mode in a Long Term Evolution (LTE) network, comprising: dynamically identifying TDD uplink-downlink configuration information for a user equipment (UE) that is connected with an enhanced NodeB (eNodeB) in said LTE network; transmitting said TDD uplink-downlink configuration information to said UE; and receiving an ACK/NACK signal over resources that are allocated based on said TDD uplink-downlink configuration information and/or signaling configured for transmitting said TDD configuration information, indicating success or failure in receiving at said UE, said TDD uplink-downlink configuration information.

Preferably said receiving and/or said transmitting are performed through MAC and/or PHY signaling.

Preferably said signaling message is a common signaling message intended to a group of UEs that communicate with said eNodeB in a common manner.

Preferably PUCCH format 3 is configured for said receiving.

Preferably PUCCH format 1b with channel selection is configured for said receiving.

Preferably a UE-specific PUCCH resource is configured by RRC signaling and used for said receiving.

Preferably said signaling message is a dedicated signaling message.

Preferably the method comprises transmitting said signaling message using DL Semi-Persistent Scheduling Activation or Release signaling for said TDD UL-DL configuration information.

Preferably the method comprises indicating said TDD UL-DL configuration information by using one or more special fields of DCI format information of said DL Semi-Persistent Scheduling Activation or Release signaling.

Preferably the method comprises indicating TDD uplink-downlink reference configuration information by re-using one or more special fields in said DCI format.

Preferably said downlink or uplink reference configuration information is directly indicated by re-using one or more special fields in said DCI format, or indirectly indicated in said DCI format by indicating the UL-DL reconfiguration set.

Preferably said one or more special fields comprise Modulation and Coding Scheme (MCS) and/or Redundancy Version (RV) field of DCI format 1A and/or Cyclic shift DM RS field of DCI format 0.

In a third aspect there is provided a computer program product comprising computer executable code which when run causes the method of any preceding aspect to be performed.

In a fourth aspect there is provided an apparatus comprising at least one processor and at least one memory including computer code for one or more programs, the at least one memory and the computer code configured, with the at least one processor, to cause the apparatus at least to: receive, while being connected with an enhanced NodeB (eNodeB) in an LTE network, a signaling message that includes TDD uplink-downlink configuration information dynamically assigned by said enhanced NodeB (eNodeB) to said UE; determine success or failure in receiving at said UE, said TDD uplink-downlink configuration information based on signaling information configured for said signaling message; generate an acknowledgement (ACK)/Non-acknowledgement (NACK) signal indicating said success or failure; and transmit said ACK/NACK signal to said eNodeB on resources that are allocated based on said TDD uplink-downlink configuration information and/or said signaling configured for said signaling message.

Preferably said apparatus is configured to receive and/or transmit through Media Access Control (MAC) and/or Physical Layer (PHY) signaling.

Preferably said signaling message is a common signaling message intended to a group of UEs that communicate with said eNodeB in a common manner.

Preferably Physical Uplink Control Channel (PUCCH) format 3 is configured for said transmitting.

Preferably said apparatus is configured to receive said TDD uplink-downlink configuration information in multiple downlink subframes of a radio frame from said eNodeB; generate corresponding ACK/NACK signals, in a order of said receiving, indicating success or failure in receiving said TDD uplink-downlink configuration information at said UE; and transmit said corresponding ACK/NACK signals, respectively, to said eNodeB.

Preferably the apparatus is configured to map said corresponding ACK/NACK signals for explicit TDD UL-DL configuration indication to one or more fixed positions for said transmitting.

Preferably PUCCH format 1b with channel selection is configured for said transmitting.

Preferably a UE-specific PUCCH resource is configured by radio resource control (RRC) signaling and used for said transmitting.

Preferably the apparatus is configured to transmit said ACK/NACK signal on said UE-specific PUCCH resource if no Physical Downlink Control Channel with assigned Physical Downlink Shared Channel (PDSCH) is detected in a same downlink (DL) subframe of said signaling message.

Preferably the apparatus is configured to, if Physical Downlink Control Channel with assigned PDSCH is detected in a same DL subframe of said signaling message, use ACK/NACK bundling to generate one ACK/NACK bit for said DL subframe and transmit said one ACK/NACK bit on implicit PUCCH resource derived by lowest Control Channel Element (CCE) index of Downlink Control Information (DCI) scrambled by Cell Radio Network Temporary Identifier (C-RNTI).

Preferably said signaling message is a dedicated signaling message.

Preferably the apparatus is configured to receive said signaling message using DL Semi-Persistent Scheduling Activation or Release signalling.

Preferably the apparatus is configured to validate a Semi-Persistent Scheduling assignment of said DL Semi-Persistent Scheduling Activation or Release signalling.

Preferably the apparatus is configured to detect said TDD uplink-downlink configuration information using DCI format information of said DL Semi-Persistent Scheduling Activation or Release signalling.

Preferably said TDD uplink-downlink configuration information is indicated by re-using one or more special fields in said DCI format.

Preferably the apparatus is configured to detect UL-DL reference configuration using DCI format information of said DL Semi-Persistent Scheduling Activation or Release signalling.

Preferably said UL-DL reference configuration information is directly indicated by re-using one or more special fields in said DCI format, or indirectly indicated in said DCI format by indicating a set of UL-DL reconfigurations.

Preferably said one or more special fields comprise Modulation and Coding Scheme (MCS) and/or Redundancy Version (RV) field of DCI format 1A and/or Cyclic shift DM RS field of DCI format 0.

In a fifth aspect there is provided an apparatus comprising at least one processor and at least one memory including computer code for one or more programs, the at least one memory and the computer code configured, with the at least one processor, to cause the apparatus at least to: dynamically identify TDD uplink-downlink configuration information for a user equipment (UE) that is connected with an enhanced NodeB (eNodeB) in an LTE network; transmit said TDD uplink-downlink configuration information to said UE; and receive an ACK/NACK signal over resources that are allocated based on said TDD uplink-downlink configuration information and/or signaling configured for transmitting said TDD configuration information, indicating success or failure in receiving at said UE, said TDD uplink-downlink configuration information.

Preferably said receiving and/or said transmitting are performed through MAC and/or PHY signaling.

Preferably said signaling message is a common signaling message intended to a group of UEs that communicate with said eNodeB in a common manner.

Preferably PUCCH format 3 is configured for said receiving.

Alternatively PUCCH format 1b with channel selection is configured for said receiving.

Preferably a UE-specific PUCCH resource is configured by RRC signaling and used for said receiving.

Preferably said signaling message is a dedicated signaling message.

Preferably the apparatus is configured to transmit said signaling message using DL Semi-Persistent Scheduling Activation or Release signaling for said TDD UL-DL configuration information.

Preferably the apparatus is configured to indicate said TDD UL-DL configuration information by using one or more special fields of DCI format information of said DL Semi-Persistent Scheduling Activation or Release signaling.

Preferably the apparatus is configured to indicate TDD UL-DL reference configuration information by re-using one or more special fields in said DCI format.

Preferably said UL-DL reference configuration information is directly indicated by re-using one or more special fields in said DCI format, or indirectly indicated in said DCI format by indicating the UL-DL reconfiguration set.

Preferably said one or more special fields comprise Modulation and Coding Scheme (MCS) and/or Redundancy Version (RV) field of DCI format 1A and/or Cyclic shift DM RS field of DCI format 0.

In a sixth aspect there is provided an apparatus comprising: means for receiving, while being connected with an enhanced NodeB (eNodeB) in an LTE network, a signaling message that includes TDD uplink-downlink configuration information dynamically assigned by said enhanced NodeB (eNodeB) to said UE; means for determining success or failure in receiving at said UE, said TDD uplink-downlink configuration information based on signaling information configured for said signaling message; means for generating an acknowledgement (ACK)/Non-acknowledgement (NACK) signal indicating said success or failure; and means for transmitting said ACK/NACK signal to said eNodeB on resources that are allocated based on said TDD uplink-downlink configuration information and/or said signaling configured for said signaling message.

Preferably said apparatus is configured to receive and/or transmit through Media Access Control (MAC) and/or Physical Layer (PHY) signaling.

Preferably said signaling message is a common signaling message intended to a group of UEs that communicate with said eNodeB in a common manner.

Preferably Physical Uplink Control Channel (PUCCH) format 3 is configured for said transmitting.

Preferably said apparatus is configured to receive said TDD uplink-downlink configuration information in multiple downlink subframes of a radio frame from said eNodeB; generate corresponding ACK/NACK signals, in a order of said receiving, indicating success or failure in receiving said TDD uplink-downlink configuration information at said UE; and transmit said corresponding ACK/NACK signals, respectively, to said eNodeB.

Preferably the apparatus comprises means for mapping said corresponding ACK/NACK signals for explicit TDD UL-DL configuration indication to one or more fixed positions for said transmitting.

Preferably PUCCH format 1b with channel selection is configured for said transmitting.

Preferably a UE-specific PUCCH resource is configured by radio resource control (RRC) signaling and used for said transmitting.

Preferably the apparatus is configured to transmit said ACK/NACK signal on said UE-specific PUCCH resource if no Physical Downlink Control Channel with assigned Physical Downlink Shared Channel (PDSCH) is detected in a same downlink (DL) subframe of said signaling message.

Preferably the apparatus is configured to, if Physical Downlink Control Channel with assigned PDSCH is detected in a same DL subframe of said signaling message, use ACK/NACK bundling to generate one ACK/NACK bit for said DL subframe and transmit said one ACK/NACK bit on implicit PUCCH resource derived by lowest Control Channel Element (CCE) index of Downlink Control Information (DCI) scrambled by Cell Radio Network Temporary Identifier (C-RNTI).

Preferably said signaling message is a dedicated signaling message.

Preferably the apparatus is configured to receive said signaling message using DL Semi-Persistent Scheduling Activation or Release signalling.

Preferably the apparatus comprises means for validating a Semi-Persistent Scheduling assignment of said DL Semi-Persistent Scheduling Activation or Release signalling.

Preferably the apparatus comprises means for detecting said TDD uplink-downlink configuration information using DCI format information of said DL Semi-Persistent Scheduling Activation or Release signalling.

Preferably said TDD uplink-downlink configuration information is indicated by re-using one or more special fields in said DCI format.

Preferably the apparatus is configured to detect UL-DL reference configuration using DCI format information of said DL Semi-Persistent Scheduling Activation or Release signalling.

Preferably said UL-DL reference configuration information is directly indicated by re-using one or more special fields in said DCI format, or indirectly indicated in said DCI format by indicating a set of UL-DL reconfigurations.

Preferably said one or more special fields comprise Modulation and Coding Scheme (MCS) and/or Redundancy Version (RV) field of DCI format 1A and/or Cyclic shift DM RS field of DCI format 0.

In a seventh aspect there is provided an apparatus comprising: means for dynamically identifying TDD uplink-downlink configuration information for a user equipment (UE) that is connected with an enhanced NodeB (eNodeB) in an LTE network; means for transmitting said TDD uplink-downlink configuration information to said UE; and means for receiving an ACK/NACK signal over resources that are allocated based on said TDD uplink-downlink configuration information and/or signaling configured for transmitting said TDD configuration information, indicating success or failure in receiving at said UE, said TDD uplink-downlink configuration information.

Preferably said receiving and/or said transmitting are performed through MAC and/or PHY signaling.

Preferably said signaling message is a common signaling message intended to a group of UEs that communicate with said eNodeB in a common manner.

Preferably PUCCH format 3 is configured for said receiving.

Alternatively PUCCH format 1b with channel selection is configured for said receiving.

Preferably a UE-specific PUCCH resource is configured by RRC signaling and used for said receiving.

Preferably said signaling message is a dedicated signaling message.

Preferably the apparatus is configured to transmit said signaling message using DL Semi-Persistent Scheduling Activation or Release signaling for said TDD UL-DL configuration information.

Preferably the apparatus is configured to indicate said TDD UL-DL configuration information by using one or more special fields of DCI format information of said DL Semi-Persistent Scheduling Activation or Release signaling.

Preferably the apparatus is configured to indicate TDD UL-DL reference configuration information by re-using one or more special fields in said DCI format.

Preferably said UL-DL reference configuration information is directly indicated by re-using one or more special fields in said DCI format, or indirectly indicated in said DCI format by indicating the UL-DL reconfiguration set.

Preferably said one or more special fields comprise Modulation and Coding Scheme (MCS) and/or Redundancy Version (RV) field of DCI format 1A and/or Cyclic shift DM RS field of DCI format 0.

Embodiments will now be described, by way of example only, with reference to the accompanying Figures in which.

In the following certain exemplifying embodiments are explained with reference to a wireless or mobile communication system serving mobile communication devices. Before explaining in detail the exemplifying embodiments, certain general principles of wireless communications are briefly explained with reference to FIGS. 1 to 3 to assist in understanding the technology underlying the described examples.

A non-limiting example of the recent developments in communication system architectures is the long-term evolution (LTE) of the Universal Mobile Telecommunications System (UMTS) standardized by the 3rd Generation Partnership Project (3GPP). More recent development of the LTE, Release 10 and upwards, are sometimes referred to as LTE-Advanced. The LTE employs a mobile architecture known as the Evolved Universal Terrestrial Radio Access Network (E-UTRAN). Base stations of such systems are known as evolved or enhanced Node Bs (eNodeBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Mobile communication devices 1 and 2 can be provided with wireless access via base stations or similar wireless transmitter and/or receiver nodes providing radio service areas or cells. The base stations are typically connected to a wider communications network via appropriate gateways. FIG. 1 shows two bases stations 10 and 12. A mobile communication device may be located in the service areas of different cells, communicate with more than one cell and be handed over from a cell to another. The base station nodes can be connected to a core communications network via appropriate gateways and/or backhaul systems. It is noted that the base stations and mobile devices are only schematically shown for illustration purposes in FIG. 1, and that the number and type of these can vary considerably from that shown.

Figure 3:
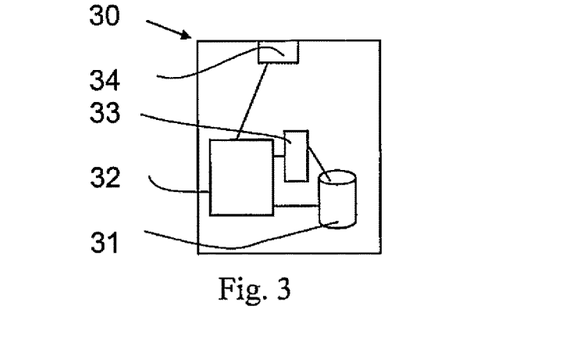
FIG. 3 shows a schematic diagram of a control apparatus according to some embodiments.

Base stations are typically controlled by at least one appropriate controller apparatus so as to enable operation thereof and management of mobile communication devices in communication with the base stations. The control apparatus can be interconnected with other control entities. FIG. 3 shows an example of a control apparatus capable of operating in accordance with the embodiments, for example to be coupled to and/or for controlling a base station. The control apparatus 30 can be arranged to provide control on communications in the service area of a cell. In some embodiments a base station can comprise a separate control apparatus. In other embodiments the control apparatus can be another network element. The control apparatus 30 can be configured to provide control functions in association with generation and communication of radio frames and necessary information for enabling flexible switching and/or allocation of radio resources for communications between the base station and mobile devices. The control functions are provided by means of a data processing facility in accordance with certain embodiments described below. For this purpose the control apparatus can comprise at least one memory 31, at least one data processing unit 32, 33 and an input/output interface 34. The control apparatus can be coupled to a receiver and/or transmitter of the base station via the interface. The control apparatus can be configured to execute an appropriate software code to provide the control functions. The control apparatus and functions may be distributed between a plurality of control units. In some embodiments, each base station can comprise a control apparatus. In alternative embodiments, two or more base stations may share a control apparatus.

A possible mobile device for communications with the base stations is often referred to as user equipment (UE) or terminal. An appropriate mobile device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile device may provide, for example, communication of data for carrying communications such as voice, electronic mail (email), text message, multimedia and so on. Users may thus be offered and provided numerous services via their devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device may receive and transmit signals over an air interface with multiple base stations via an appropriate transceiver apparatus.

Figure 4:
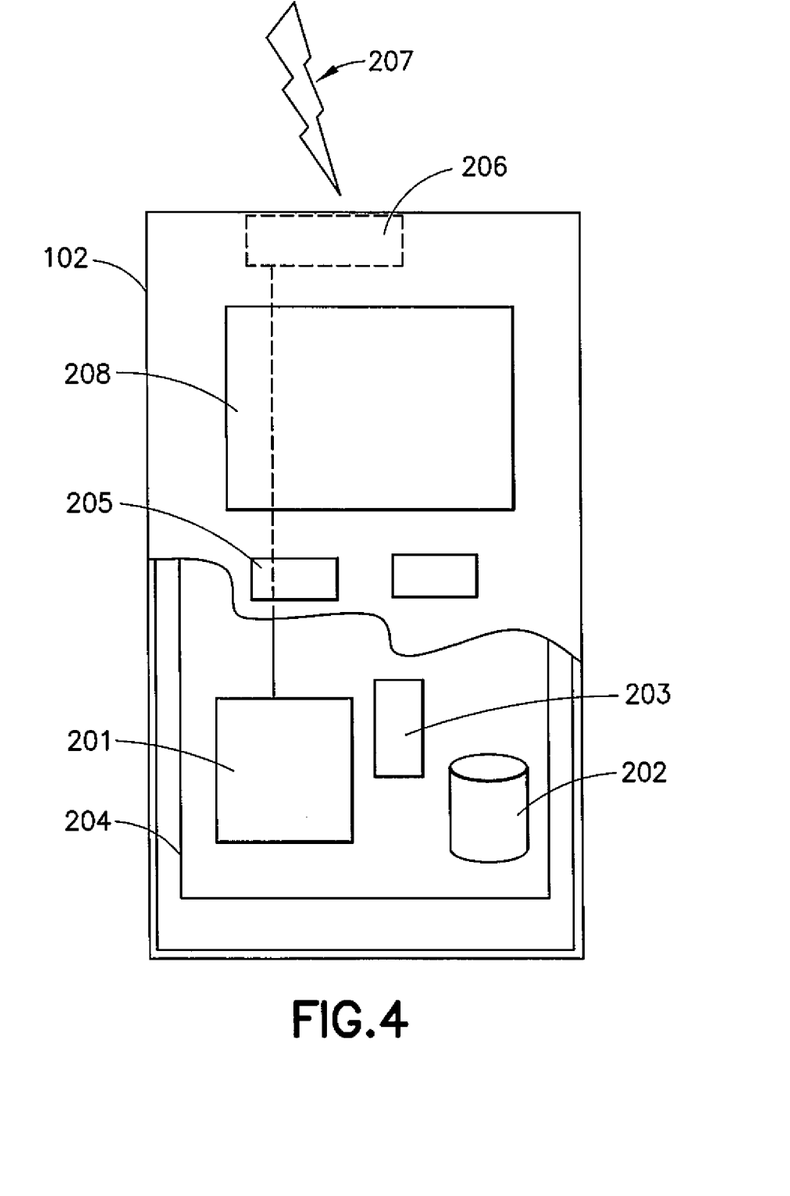
FIG. 4 shows a schematic diagram of a user equipment according to some embodiments.

A possible mobile communication device for transmitting and retransmitting information blocks towards the stations of the system will now be described in more detail in reference to FIG. 4 showing a schematic, partially sectioned view of a communication device 102. The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

A wireless communication device, such as a base station and/or a mobile station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antenna elements.

FIG. 2 illustrates a radio frame structure 20 for LTE time division duplex (TDD). In this example the switching between the subframes follows existing LTE UL-DL configuration 1 (see also FIG. 5 which explains the configurations in more detail). In LTE TDD physical layer one radio frame is divided into 10 subframes. A LTE TDD radio frame is further divided into 0.5 ms timeslots, two consecutive slots forming one subframe. Thus each frame 20 is divided into ten 1 ms subframes #0-#9. Each frame can comprise at least one subframe 21 containing special fields known as downlink pilot time slot (DwPTS) 22, guard period (GP) 23 and uplink pilot time slot (UpPTS) 24. Such a subframe is commonly referred to as a special subframe. The special subframes of frame 20 are located at subframes #1 and #6 and are denoted by S. The special subframe has been defined e.g. for in LTE Release 8. According to LTE specifications the fields of a special subframe can have nine different configurations. The lengths of the individual fields 22, 23 and 24 in a special subframe can depend on the uplink/downlink configuration selected by the network. The total length of the three fields in a LTE special frame remains constant at 1 ms.

A process known as timing advance is provided to prevent conflicts when switching from the uplink to the downlink transmission. When switching from the downlink to the uplink, a guard period (GP) 23 is inserted between Downlink Pilot Timeslot (DwPTS) 22 and Uplink Pilot Timeslot (UpPTS) 24 fields. The duration of the GP 23 can depend on various factors, for example the signal propagation time from a base station to mobile device and back as well as on the time the mobile device requires to switch from receiving to sending.

Figure 5:
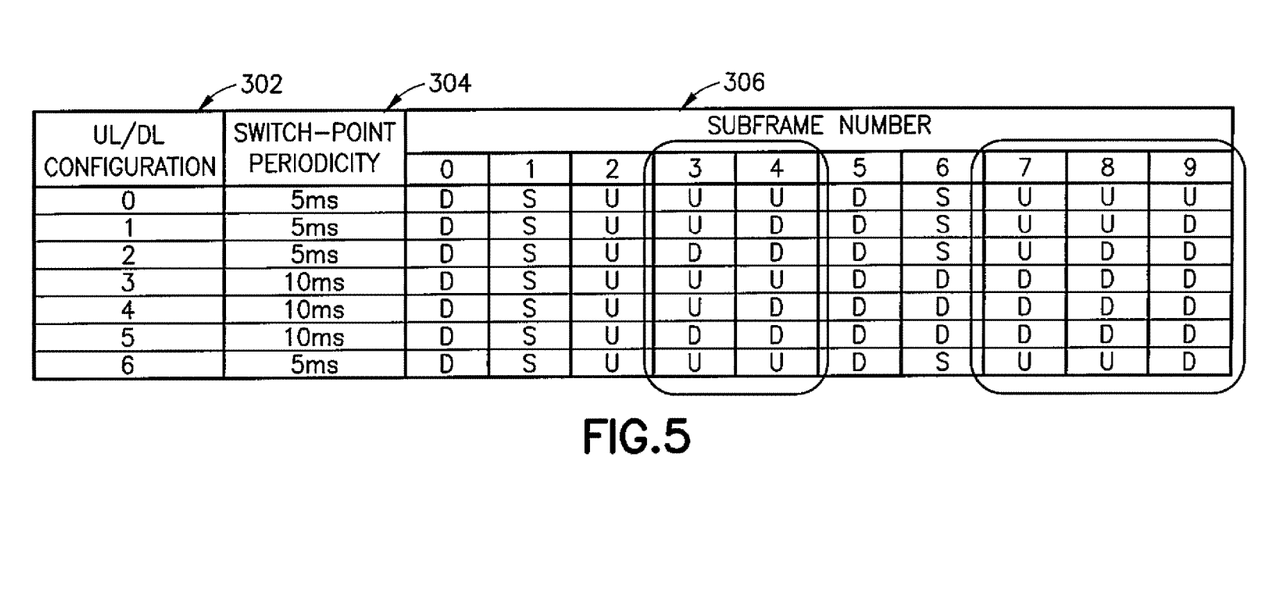
FIG. 5 shows uplink/downlink subframe configurations according to some embodiments.

One radio frame configuration has been discussed above with respect to FIG. 2. A radio frame spans 10 ms and consists of ten 1 ms subframes. Subframes 0 and 5 may contain synchronization signal and broadcast information necessary for the UEs to perform synchronization and obtain relevant system information, making them downlink subframes. Subframe 1 is a special subframe that contains a primary synchronization signal and can serve as a switching point between downlink to uplink transmission. It contains three fields—Downlink Pilot Time Slot (DwPTS), Guard Period (GP) and Uplink Pilot Time Slot (UpPTS). Currently, LTE TDD allows for asymmetric UL-DL allocations by providing seven different semi-statically configured TDD UL-DL configurations as shown in FIG. 5. Each of the seven UL-DL configurations is shown in column 302, providing the seven configurations labelled 0 to 6. The switch point periodicity for each configuration is shown in column 304. Two switching point periodicities are supported—5 ms and 10 ms. For the 5 ms switching point periodicity, subframe 6 is likewise a special subframe identical to subframe 1. For the 10 ms switching point periodicity, subframe 6 is a regular downlink subframe. The 5 ms switching point periodicity may support the co-existence between LTE and low-chip-rate Universal Terrestrial Radio Access (UTRA) TDD systems, and 10 ms switching point periodicity may support the coexistence of LTE and high-chip-rate UTRA TDD systems. The supported configurations cover a wide range of UL-DL allocations from a DL-heavy configuration (9:1 ratio DL:UL) to a UL heavy configuration (4:6 ratio DL:UL). TDD systems such as the LTE TDD system have flexibility in terms of the proportion of resources assignable to uplink and downlink communications within a given assignment of spectrum. Specifically, it is possible to distribute the radio resource unevenly between uplink and downlink to provide a way to utilize radio resources more efficiently by selecting a UL-DL configuration based on, for example, different traffic characteristics in DL and UL. TDD UL-DL configuration information may be dynamically indicated/signaled by the eNodeB to UEs through various ways such as, for example, RRC signalling, SIB1 signalling, MAC signalling and physical layer signalling.

Taking UL-DL configuration 3 as an example, this has a switch point periodicity of 10 ms. Subframes 0 and 5 to 9 are downlink subframes, and subframes 2 to 4 are uplink subframes.

The seven UL-DL configurations available can provide between 40% and 90% DL subframes, for example. The current mechanism for adapting UL-DL allocation is based on the system information change procedure with 640 ms period, and the TDD UL-DL configuration is semi-statically informed by SIB-1 (System Information Broadcast) signalling.

A recent development which has been proposed is "Further Enhancements to LTE TDD for DL-UL Interference Management and Traffic Adaptation (LTE_TDD_eIMTA)". According to this proposal, dynamic TDD UL-DL reconfiguration is a feature of LTE Rel-12 and beyond. A purpose for this proposal is to provide flexibility to have dynamic TDD UL-DL configurations in a TDD system to match uplink and downlink traffic variation.

One objective is to enable TDD UL-DL reconfiguration for traffic adaptation in a small cell, such as pico or femtocells. Other considerations are the HARQ scheduling timeline, RLM/RRM (Radio Link Monitor/Radio Resource Management) measurements, Channel State Information (CSI) reporting. Another consideration is an interference mitigation scheme or schemes for systems with TDD UL-DL reconfiguration to ensure coexistence in the agreed deployment scenario, and to provide mechanisms for the interference mitigation schemes.

Returning to FIG. 5, the subframe numbers 3, 4, 7, 8, and 9 could be UL-DL depending on the "current" UL-DL configuration. This can provide different UL and DL traffic loads. The UEs need to know current UL-DL configuration used so as to support Hybrid automatic repeat request (HARQ) feedback and RRM/CSI report. There are several ways to indicate the UL-DL configuration, including RRC signalling, SIB-1 signalling, MAC signalling and Physical Layer (PHY) signalling.

One proposal is to use the PHY signalling (not including Physical Broadcast Channel (PBCH)/Masterinformation-Block (MIB)) or Media Access Control (MAC) signalling. The MAC and PHY signalling options for indicating UL-DL configurations to a UE may provide improved performance compared to SIB-1 and RRC signalling.

However, neither MAC nor PHY signalling have their own error recovery processes. Accordingly a "false alarm" issue may be caused if a UE misses or does not correctly decode the TDD UL-DL configuration indication carried on either the MAC or PHY signalling. The false alarm issue may lead to inter-cell interference due to an incorrect uplink transmission in a downlink subframe (or vice versa) or an incorrect CSI/RSRP (Reference Signal Received Power) update measurement in an uplink subframe. The present inventors have recognised that it is necessary to overcome this false alarm issue.

To this end embodiments provide a HARQ-ACK/NACK (Hybrid Automatic Repeat Request Acknowledgement/Non-Acknowledgement) confirmation mechanism to handle where and how an ACK/NACK should be transmitted in response to dynamic PHY/MAC UL-DL configuration commands. In this regard, the ACK/NACK indicates success or failure in receiving at the UE, the dynamic PHY/MAC UL-DL configuration commands. These commands may be issued from the network (e.g. from an eNodeB) to the UE. A further issue with the ACK/NACK confirmation mechanism is how to allocate ACK/NACK resources in the case of cell specific RNTI, i.e., "Flex TDD-RNTI" is applied and how to transmit the ACK/NACK feedback in a case where the UE specific C-RNTI (Cell Radio Network Temporary Identifier) is applied in the same downlink subframe for downlink data transmission.

In terms of physical layer signalling for indicating the UL-DL configuration, a new RNTI may be introduced to scramble the physical downlink control channel (PDCCH), which may be used in a common manner to indicate the UL-DL configuration to a group of users. In this manner a mechanism to feedback ACK/NACK to confirm the UL-DL configuration may be provided. Another possible way is the use of existing RNTI, such as semi-persistent scheduling C-RNTI.

These are discussed in more detail below.

As discussed with respect to FIG. 5, there are currently seven TDD UL-DL configurations which have been specified since Rel-8 in LTE TDD. These configurations can provide between 40% and 90% DL subframes, for example. However, some configurations provide similar DL/UL ratios. For example, both TDD UL-DL configurations 2 and 4 (see FIG. 5) provide a DL ratio of 80%.

The eNodeB dynamically identifies TDD UL-DL configuration information/indication for UEs that are connected with the eNodeB, that is, in a RRC-connected state, for example. The eNodeB may transmit the dynamically identified UL-DL configuration information to the UEs.

For downlink reference timing it is optimal to use the DL heaviest TDD UL-DL configuration of the supported TDD UL-DL configurations for dynamic selection. For example, if all seven TDD UL-DL configurations or the three configurations with 10 ms switching period are dynamically selected for reconfiguration, then TDD UL-DL configuration 5 can be configured as the downlink reference timing, since it has the greatest number of downlink subframes. Likewise, if the four configurations with 5 ms switching period are dynamically selected for reconfiguration, then TDD UL-DL configuration 2 can be configured as the PDSCH HARQ reference timing since it has the greatest proportion of downlink subframes from that group. In that sense, if eNodeB indicates to the UE that the TDD UL-DL configuration sets for reconfiguration are, for example, the four UL-DL configurations with 5 ms switching point, or the three UL-DL configurations with 10 ms switching point, or all seven UL-DL configurations, then the UE shall know the DL reference timing by just selecting the DL heaviest UL-DL configuration as the reference configuration.

For UL reference timing, it is possible to use the UL-heaviest TDD UL-DL configuration within the TDD UL-DL configuration sets for reconfiguration, i.e. using Configuration 0 as the UL reference timing if all seven UL-DL configurations or all four UL-DL configurations with 5 ms switching points can be selected for reconfiguration. If only the three UL-DL configurations with 10 ms switching point can be selected for reconfiguration, then UL-DL configuration 3 can be used as UL reference timing.

Embodiments may facilitate flexible TDD configuration, which enables an eNodeB to switch the UL-DL configurations between the existing seven UL-DL configurations. In particular, embodiments facilitate the transmission of ACK/NACK messages from a UE to an eNodeB to confirm whether a reconfiguration is successful.

Two main situations are discussed below:
(a) if the TDD UL-DL reconfiguration is to indicate to a group of UEs that communicate with an eNodeB in a common manner; and
(b) if the TDD UL-DL reconfiguration is to indicate to a specific UE in a dedicated manner.

TDD UL-DL Reconfiguration is to Indicate a Group of UE in Common Manner

In one embodiment PUCCH format 3 is configured for transmission of HARQ-ACK. PUCCH format 3 is a standardised format which a UE can use to feedback HARQ-ACK. In other embodiments PUCCH format 1b with channel selection may be used.

Accordingly in this example UL-DL reference configuration is determined and PUCCH format 3 is configured for transmission of HARQ-ACK. The ACK/NACK bit(s) for confirmation of receipt of the UL-DL configuration from an eNodeB are mapped to a fixed position (for example, the $1^{st}$ position or the last or other fixed position) after the ACK/NACK bitstream corresponding to the PDSCH or PDCCH indicating the DL-SPS (Semi Persistent Scheduling) release is generated. This is further explained below with reference to FIG. 6.

In some embodiments the UL-DL configuration indication can be transmitted multiple times to increase UE reception robustness i.e to increase the chances of the UE receiving the indication. For example, the eNodeB may transmit the UL-DL configuration indication in multiple downlink subframes of a radio frame to the UE. The UE may generate or create an ACK/NACK bit or signal for each UL-DL configuration indication received from the eNodeB. The resulting ACK/NACK bit stream may be managed or placed in an order of the reception of the UL-DL configuration indication. In one embodiment, the UE may transmit the resulting ACK/NACK bit stream to the eNodeB to confirm the reception of the UL-DL configuration indication. In another embodiment, the UE may map or combine the ACK/NACK bitstream to one or more fixed ACK/NACK positions, for example, a fixed single ACK/NACK position, of the ACK/NACK stream. In this way, the UE may transmit resulting one or more ACK/NACK bits or signals to the eNodeB to confirm the reception of the UL-DL configuration indication. The resources that are used for the ACK/NACK transmission may be determined based on the UL-DL configuration indication and/or the signalling information configured for the transmission of the UL-DL configuration indication from the eNodeB.

In some embodiments, if no PDSCH and DL SPS release is detected by a UE, then the UE will not feedback HARQ-ACK with respect to the PDSCH. However the UE may use UE-specific PUCCH resource to transmit or indicate, to the eNodeB, the ACK/NACK with respect to a UL-DL configuration indication received from the eNodeB. If multiple UL-DL configuration indications are received by UE from different subframes, the corresponding HARQ bits are ordered as PDSCH HARQ bits mapping.

For PUCCH format 1b with channel selection, a UE-specific PUCCH resource is configured by RRC. If UE doesn't detect other PDSCH for downlink data transmission or PDCCH indicating DL SPS release, UE shall transmit the ACK/NACK corresponding to configuration indication signalling on the UE-specific PUCCH resource; if it does detect other PDSCH or PDCCH indicating DL SPS release then the UE uses ACK/NACK bundling to generate one ACK/NACK bit and transmits on the PUCCH resource derived by lowest CCE index of corresponding DCI.

Figures 6, 6A:
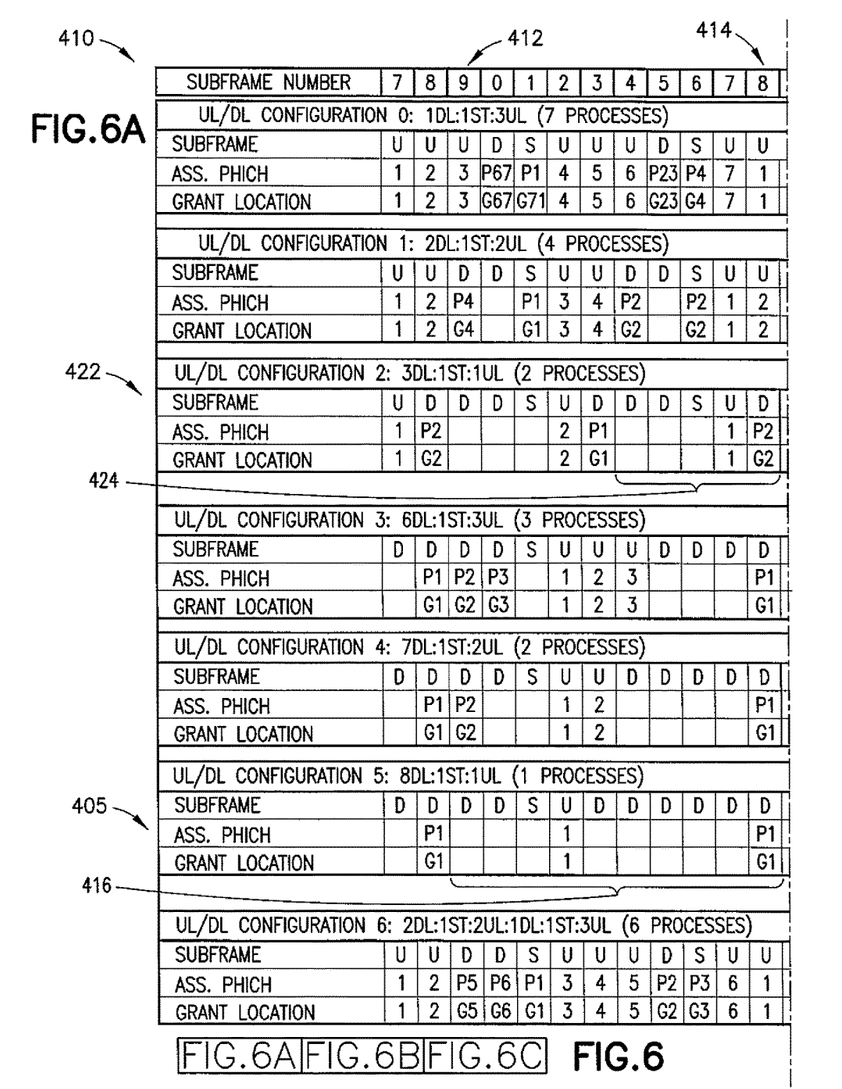
FIG. 6 shows in more detail uplink/downlink frame and HARQ timing/process according to some embodiments.
Figure 6B:
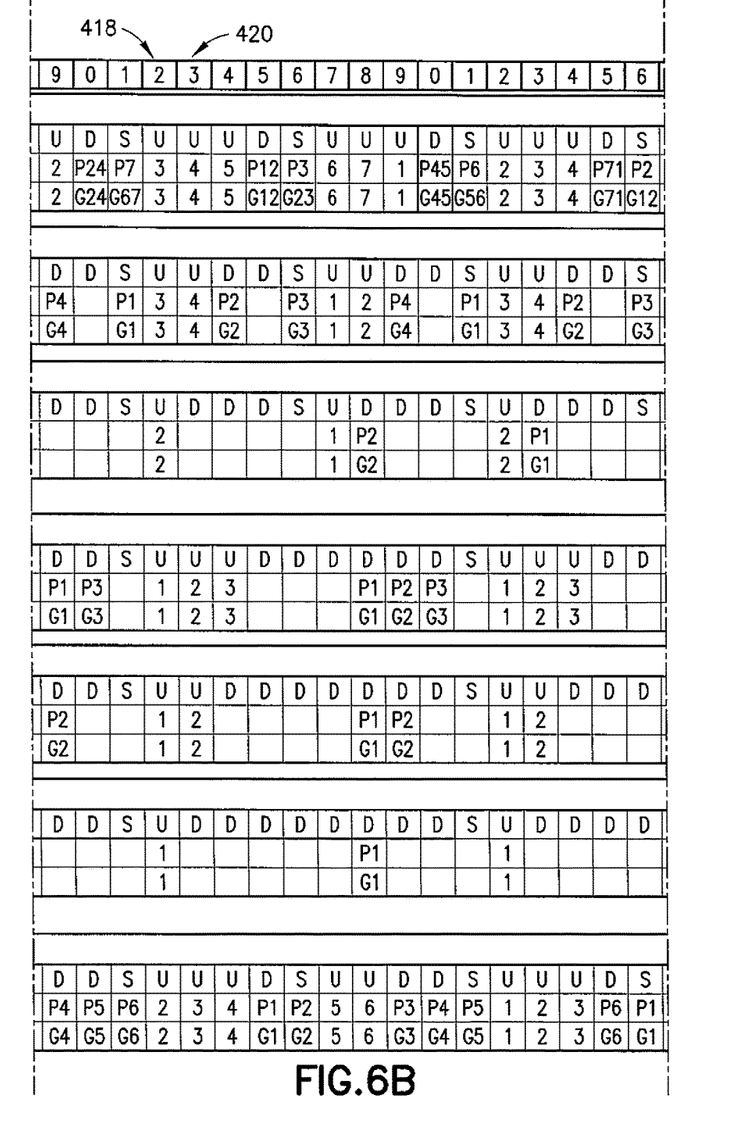
Figure 6C:
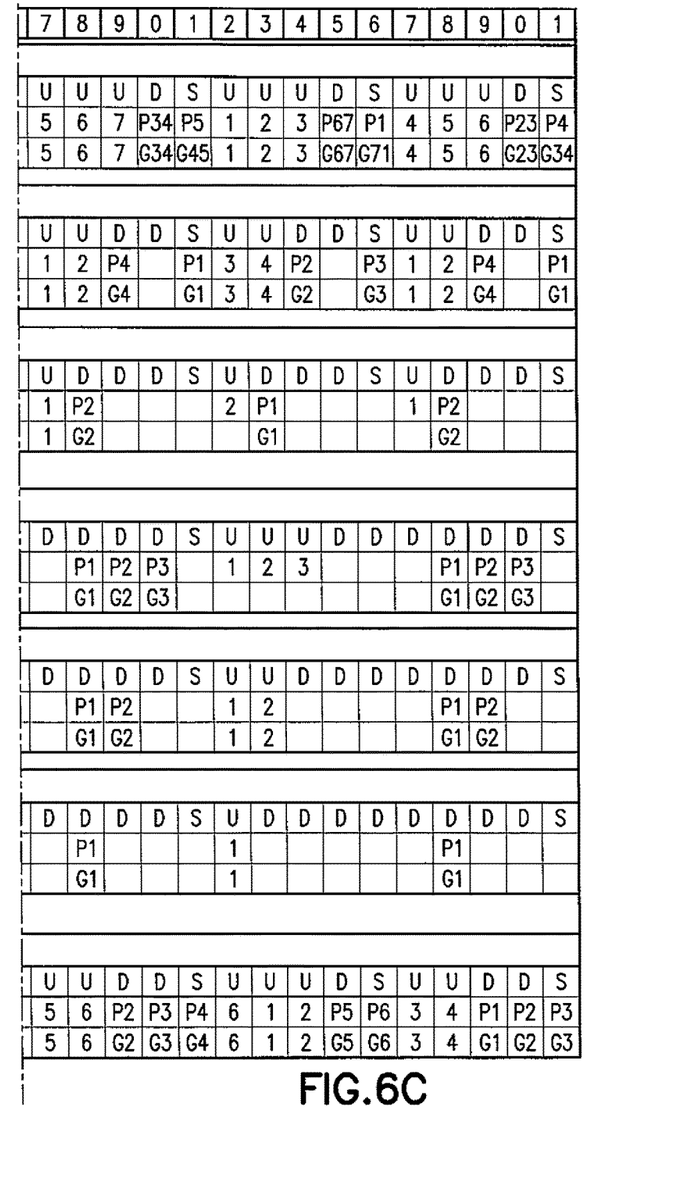

This mapping is illustrated in more detail in FIG. 6. Again in this embodiment PUCCH format 3 is configured for ACK/NACK feedback. Also in this example TDD UL-DL configuration 5, shown at 405 of FIG. 6, is used for downlink reference timing.

As discussed above, the ACK/NACK confirmation corresponding to explicit TDD UL-DL configuration indication signalling is mapped to the position after the ACK/NACK bitstream corresponding to PDSCH or PDCCH indicating DL SPS release. As shown in FIG. 6, if UL-DL configuration 5 is used for downlink reference timing, the PDSCH or PDCCH indicating DL-SPS release are received at the UE from subframe 9 (see 412) of a "previous" radio frame to subframe 8 (see 414) of a "current" radio frame. This stream is designated generally at 416. The HARQ-ACK feedback relating to the PDSCH or PDCCH indicating DLS-SPS release is transmitted from the UE in subframe 2 (see 418) of the "next" radio frame. As discussed above, the ACK/NACK bit(s) corresponding to the explicit TDD UL-DL configuration indication is mapped to a fixed position, for example, the first or last position of the ACK/NACK bit stream corresponding to PDSCH or PDCCH indicating DL-SPS release from Subframe 9 to Subframe 8. Accordingly the ACK/NACK bit(s) specifically relating to TDD UL-DL configuration indication is transmitted in Subframe 2 of the "next" frame, shown at 418 in FIG. 6.

For the generated ACK/NACK bitstream, if the ACK/NACK repetition bit corresponding to TDD UL-DL configuration indication is located in the last position of the ACK/NACK bit stream corresponding to Subframe 9 to Subframe 8, the last (9-M-confirmation) bits in case of transmission mode (TM) 1, 2, 5, 6, 7 or TM 3, 4, 8, 9 with spatial bundling, or the last (18-2M-confirmation) bits in case of TM 3, 4, 8, 9 without spatial bundling are padded with DTX (discontinuous transmission).

In other words the generated ACK/NACK bit stream can be denoted as $a_0, a_1, a_2, \ldots, a_M, a_{M+1}, \ldots, a_9$ in case of TM 1, 2, 5, 6, 7 or TM3, 4, 8, 9 with spatial bundling or $a_0, a_1, a_2, \ldots, a_{2M}, a_{2M+1}, \ldots, a_{18}$ in case of TM 3, 4, 8, 9 without spatial bundling, where $a_M, a_{M+1}, \ldots$ are the ACK/NACK bits corresponding to the explicit TDD UL-DL configuration indications via either PDCCH or PDSCH. $a_0, a_1, a_2, \ldots, a_{M-1}$ are the ACK/NACK bits corresponding to PDSCH or PDCCH indicating DL SPS release from Subframe 9 to Subframe 8 in next radio frame in case of TM1, 2, 5, 6, 7 or TM3, 4, 8, 9 with spatial bundling; while $a_0, a_1, a_2, \ldots, a_{2M}$ are the ACK/NACK bits corresponding to PDSCH or PDCCH indicating DL SPS release from Subframe 9 to Subframe 8 in next radio frame in case of TM3, 4, 8, 9 without spatial bundling. Other bits in PUCCH format 3 are padded with DTX.

The transmission mode (TM) is a mode which is predefined in the LTE specifications. "Spatial bundling" comprises two bits compressed into one bit after a logic AND operation. "M" is the bundle window size determined by the adopted TDD UL-DL configuration and the corresponding uplink subframe for HARQ-ACK transmission. The "bundle window size" refers to the number of the DL subframes that require feedback in one UL subframe. Taking configuration 5 for example the bundle window size is 9, since UE needs to transmit ACK/NACK corresponding to 9 downlink subframes (from Subframe 9 to Subframe 8) in one UL subframe.

In an alternative embodiment, the ACK/NACK confirmation bit corresponding to explicit TDD UL-DL configuration indication signalling can be mapped to the first or a fixed or predetermined position of the generated ACK/NACK bitstream. Accordingly the UE and eNodeB will know the UL-DL configuration confirmation bit location, and accordingly can retrieve this information.

In another example PUCCH format 3 is again configured for ACK/NACK feedback, but this time with UL-DL configuration 2 used for downlink reference timing, referenced as 422 in FIG. 6. The ACK/NACK confirmation corresponding to explicit TDD UL-DL configuration indication signalling together with ACK/NACK bitstream corresponding to PDSCH or PDCCH indicating DL-SPS release that occur in the same radio frame are transmitted in one UL subframe, as shown at 424.

In another case PUCCH format 1b with channel selection is configured for transmission of HARQ-ACK. In this embodiment a UE specific PUCCH resource may be configured by RRC (Radio Resource Control) signalling and used for ACK/NACK confirmation transmission corresponding to the TDD UL-DL configuration via either MAC or PHY in a downlink subframe. If the TDD UL-DL configuration information is transmitted to the UE via either MAC or PHY signalling then:

if there is no C-RNTI scrambled PDCCH corresponding to PDSCH with DL data transmission detected in the same downlink subframe with TDD UL-DL configuration indication signalling, then the UE will transmit the ACK/NACK on the preconfigured PUCCH resource according to the configured DL HARQ reference timing after the detection of the TDD UL-DL configuration signalling. Therefore in such a case the HARQ-ACK mapping rule may be the same as the current standard mechanism.

If C-RNTI scrambled PDCCH corresponding to PDSCH for DL data transmission is detected in the same downlink subframe with TDD UL-DL configuration indication signalling, then the UE uses logic AND operation to generate one ACK/NACK and transmit it on the PUCCH resource determined by the lowest Control Channel Element (CCE) index of the corresponding downlink control information (DCI) contained in the C-RNTI scrambled PDCCH according to the configured DL HARQ reference timing.

TDD UL-DL Reconfiguration is to Indicate to a Specific UE in a Dedicated Manner

In this embodiment DL semi-persistent scheduling activation or release (SPS) is used.

In this second case, the DL Semi-Persistent Scheduling Activation or Release signalling may be used by the eNodeB to signal or inform the UE about the UL-DL configuration that is dynamically identified by the eNodeB. In this regard, the UE validates a semi-persistent scheduling (SPS) assignment with a current standard mechanism. More specifically, the UE may detect TDD uplink-downlink configuration information dynamically assigned by the eNodeB using DCI format information of the DL Semi-Persistent Scheduling Activation or Release signalling. For example, the UE considers the received correct DCI information as a valued semi-persistent activation or release with current standing mechanism. In particular, the adopted TDD uplink-downlink configuration information may be indicated by re-using one or more special fields in the DCI format. The current TDD UL-DL configuration information can be directly indicated by re-using the one or more special fields in the DCI format. Alternatively, the UL-DL reference configuration information may be directly indicated by re-using the one or more special fields in said DCI format, or indirectly indicated in the DCI format by indicating the UL-DL reconfiguration set. The one or more special fields may comprise Modulation and Coding Scheme (MCS) and/or Redundancy Version (RV) field of DCI format 1A and/or Cyclic shift DM RS field of DCI format 0.

For example, if the UE verifies SPS release PDCCH validation, and if the special fields in downlink control information (DCI) format 1A is the same as Table 1 below, then the UE shall assume the UL-DL configuration as indicated.

TABLE 1

|  | DCI format 1A |
|---|---|
| TPC command for scheduled PUSCH | N/A |
| Cyclic shift DM RS | N/A |
| Modulation and coding scheme and redundancy version | N/A |
| Resource block assignment and hopping resource allocation | N/A |
| HARQ process number | TDD UL-DL configuration |
| Modulation and coding scheme | set to '0000' |
| Redundancy version | set to '11' |
| Resource block assignment | Set to all '0's |

The "HARQ process number" field indicates the actual TDD UL-DL configuration for the UE to implement. In an alternative embodiment, the "Modulation and coding scheme" field can be used as UL-DL configuration also, and "Redundancy version" and "Resource block assignment" fields can be set to other values. For example, The 6 bits of MAC/RV fields may be directly re-used by the eNB to signal the TDD UL-DL configuration to the UE. In addition, one single bit may be used to indirectly indicate the UL-DL configuration to the UE for the scenario of a set of all 4 configurations with 5 ms switching points or a set of all 3 configurations with 10 ms switching points. That is, the signalled UL-DL configuration is a set of the 4 configurations with 5 ms switching points or a set of the 3 configurations with 10 ms switching points.

In this case the TDD UL-DL configuration confirmation HARQ-ACK transmission is configured with PUCCH format 3 or PUCCH format 1b which are selected. The PUCCH resource and HARQ-ACK bit ordering is the same as SPS release.

This approach is useful when UE specific PDSCH is transmitted in the same subframe with the TDD UL-DL configuration indication signalling. Such downlink subframe for TDD UL-DL configuration indication can be used for downlink data transmission, which may avoid downlink performance loss.

Accordingly aspects of a method apparatus, and computer program for acknowledging TDD UL-DL reconfiguration in LTE TDD systems are provided by embodiments. In accordance with various embodiments, the UE, when connected with the eNB in LTE systems, may receive a UL-DL configuration signaling message that includes TDD UL-DL configuration information or indication that is dynamically assigned by the eNB to the UE.

The UE may determine success or failure in receiving at the UE, the TDD uplink-downlink configuration information based on signalling information configured for transmission of the UL-DL configuration signaling message. The UE generates an ACK/NACK signal indicating the success or failure of the reception of the signalled TDD uplink-downlink configuration information. The UE then transmits the ACK/NACK signal to the eNB on resources that are determined based on the signalling information configured for transmission of the UL-DL configuration signalling message and the TDD uplink-downlink configuration information. The UL-DL configuration signalling message and the ACK/NACK signal may be communicated between the UE and the eNB using MAC and/or PHY signalling. In some instances, the UL-DL configuration signaling message is a common signalling message intended to a group of UEs that communicate with the eNB in a common manner. In this regard, the eNB may configure or assign PUCCH format 3 for ACK/NACK transmission for the UE to confirm the reception of the TDD UL-DL configuration information dynamically signalled or assigned by the eNB to the UE. The eNB may transmit the dynamic UL-DL configuration information in multiple subframes of a radio frame. The UE may map corresponding ACK/NACK bits or signals for explicit TDD UL-DL configuration indication to one or more fixed positions for transmission. In some instances, the eNB may configure PUCCH format 1b with channel selection for ACK/NACK transmission for the UE to confirm the reception of the TDD UL-DL configuration information dynamically signalled or assigned by the eNB to the UE. In this regard, the eNB may configure a UE-specific PUCCH resource by radio resource control (RRC) signaling for use at the UE for the ACK/NACK transmission. For example, the UE may transmit the ACK/NACK bit or signal on the UE-specific PUCCH resource if no Physical Downlink Control Channel with assigned Physical Downlink Shared Channel (PDSCH) is detected in the same downlink (DL) subframe in which the UL-DL configuration signaling message is received. If Physical Downlink Control Channel with assigned PDSCH is detected in the same DL subframe of the UL-DL configuration signaling message, the UE may use ACK/NACK bundling to generate one ACK/NACK bit for the DL subframe and transmit the one ACK/NACK bit on implicit PUCCH resource derived by lowest Control Channel Element (CCE) index of Downlink Control Information (DCI) scrambled by Cell Radio Network Temporary Identifier (C-RNTI).

In some instances where the UL-DL configuration signaling message is a dedicated signaling message. The UE may receive the UL-DL configuration signalling message using DL Semi-Persistent Scheduling Activation or Release signalling. The UE may validate a Semi-Persistent Scheduling assignment of the DL Semi-Persistent Scheduling Activation or Release signalling so as to detect the UL-DL configuration embedded in the received messages. For example, the UE may detect or identify the TDD uplink-downlink configuration information using DCI format information of the DL Semi-Persistent Scheduling Activation or Release signalling. The TDD uplink-downlink configuration information may be indicated by re-using one or more special fields in the DCI format. The TDD uplink-downlink configuration information or TDD uplink-downlink reference configuration information may be directly indicated by re-using one or more special fields such as MAC/RV fields in the DCI format 0 or 1A, for example. A set of UL-DL reconfigurations may be indirectly indicated in the DCI format by using one single bit.

It is noted that whilst embodiments have been described using LTE and LTE Advanced as examples, similar principles can be applied to any other communication system or indeed to further developments with LTE where TDD is employed. Thus, instead of LTE, the invention may be applied to other cellular standards as well. Also, instead of carriers provided by base stations at least one of the carriers may be provided by a communication device such as mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

What is claimed is:

1. A method for configuring a Time Division Duplex (TDD) mode of a user equipment (UE) in a network, comprising:
    receiving, while being connected with a base station in said network, a signaling message that includes TDD uplink-downlink configuration information dynamically assigned by said base station to said UE;
    determining in which field of downlink control information (DCI) the TDD uplink-downlink configuration information resides, where the TDD uplink-downlink configuration information occupies one or more special fields in the DCI information meant to contain other information;
    retrieving the TDD uplink-downlink configuration information from the determined field of the DCI;
    generating an acknowledgement(ACK)/Non-acknowledgement(NACK) signal indicating success or failure of reception of the retrieved TDD uplink-downlink configuration information;
    determining resources to use to send the ACK NACK signal based at least on a current one of multiple allocated physical uplink control channel formats, wherein the determining resources uses different information to determine the resources for different ones of the multiple allocated physical uplink control channel formats; and
    transmitting said ACK NACK signal to said base station on the determined resources.

2. A method as claimed in claim 1, wherein said receiving and/or said transmitting are performed through Media Access Control (MAC) and/or Physical Layer (PHY) signaling.

3. A method as claimed in claim 1, wherein said signaling message is a common signaling message intended to a group of UEs that communicate with said base station in a common manner.

4. A method as claimed in claim 1, wherein the multiple allocated physical uplink channel formats comprise Physical Uplink Control Channel (PUCCH) format 3 or PUCCH format 1b.

5. A method as claimed in claim 4, wherein:
    the method comprises receiving said TDD uplink-downlink configuration information in multiple downlink subframes of a radio frame from said base station;
    the method comprises generating corresponding ACK NACK signals, in an order of said receiving, indicating success or failure in receiving said TDD uplink-downlink configuration information at said UE; and
    the transmitting comprises transmitting said corresponding ACK NACK signals, respectively, to said base station using the determined resources.

6. A method as claimed in claim 1, wherein:
    generating the acknowledgement(ACK)/Non-acknowledgement(NACK) signal comprises using ACK/NACK bundling to generate one ACK/NACK bit for said DL subframe;
    determining resources comprises if determining the format of the physical uplink channel is a format 1b, and the determining resources further comprises, in response to Physical Downlink Control Channel with assigned PDSCH being detected in a same DL subframe of said signaling message, determining the resources using the information of an implicit PUCCH resource derived by lowest Control Channel Element (CCE) index of Downlink Control Information (DCI) scrambled by Cell Radio Network Temporary Identifier (C-RNTI); and
    transmitting further comprises transmitting said one ACK/NACK bit on the determined resources.

7. A non-transitory computer-readable medium having a computer program product comprising computer executable code, which when run on an apparatus causes the method of claim 1 to be performed on the apparatus.

8. The method of claim 1, wherein TDD uplink-downlink configuration information occupies a "HARQ process number" field in the DCI and the other information is the HARQ process number.

9. The method of claim 1, wherein TDD uplink-downlink configuration information occupies a "Modulation and coding scheme" field in the DCI and the other information is the Modulation and coding scheme.

10. The method of claim 1, further comprising determining success in receiving TDD uplink-downlink configuration information in response to both PDCCH validation and special fields in the DCI having a particular configuration.

11. The method of claim 1, wherein determining resources comprises determining the format of the physical uplink channel is a format 1b, and the determining resources further comprises:
    detecting whether a physical downlink control channel with uplink/downlink reconfiguration signaling;
    in response to the physical downlink control channel with uplink/downlink reconfiguration signaling being detected, determining the resources using the information of an implicit physical uplink control channel resource derived by a lowest control channel element index of downlink control information scrambled by a cell radio network temporary identifier; and otherwise, in response to the physical downlink control channel with uplink/downlink reconfiguration signaling not being detected, determining the resources using the information of a preconfigured physical uplink control channel resource according to a configured downlink hybrid automatic repeat request reference timing.

12. The method of claim 1, wherein determining resources comprises determining the format of the physical uplink channel is a format 3, and the determining resources further comprises:
   detecting whether a physical downlink shared channel or physical downlink control channel indicates a downlink semi persistent scheduling release;
   in response to detection of the physical downlink shared channel or physical downlink control channel indicating the downlink semi persistent scheduling release, determining the resources using the information of an ACK NACK bit stream corresponding to the physical downlink shared channel or the physical downlink control channel indicating the downlink semi persistent scheduling release and mapping ACK NACK information for the TDD uplink-downlink configuration information to one or more fixed position(s) corresponding to the ACK NACK bit stream; and
   otherwise, in response no detection of the physical downlink shared channel or physical downlink control channel indicating the downlink semi persistent scheduling release, determining the resources using the information of a user equipment-specific physical uplink control channel to feed back the TDD uplink-downlink configuration information.

13. A method for configuring a Time Division Duplex (TDD) mode in a network, comprising:
   dynamically identifying TDD uplink-downlink configuration information for a user equipment (UE) that is connected with a base station in said network;
   transmitting said TDD uplink-downlink configuration information to said UE, wherein the transmitting transmits the TDD uplink-downlink configuration information in one or more fields of downlink control information (DCI), where the TDD uplink-downlink configuration information occupies one or more special fields in the DCI information meant to contain other information;
   determining resources to use to receive an ACK NACK signal based at least on a current one of multiple allocated physical uplink control channel formats, wherein the determining resources uses different information to determine the resources for different ones of the multiple allocated physical uplink control channel formats, wherein the ACK/NACK signal indicates success or failure in receiving at said UE said TDD uplink-downlink configuration information; and
   receiving the ACK/NACK signal over the determined resources.

14. An apparatus comprising at least one processor and at least one memory including computer code for one or more programs, the at least one memory and the computer code configured, with the at least one processor, to cause the apparatus at least to:
   receive, while being connected with a base station in a network, a signaling message that includes TDD uplink-downlink configuration information dynamically assigned by said base station to said UE;
   determine in which field of downlink control information (DCI) the TDD uplink-downlink configuration information resides, where the TDD uplink-downlink configuration information occupies one or more special fields in the DCI information meant to contain other information;
   retrieving the TDD uplink-downlink configuration information from the determined field of the DCI;
   generate an acknowledgement(ACK)/Non-acknowledgement(NACK) signal indicating said success or failure of reception of the retrieved TDD uplink-downlink configuration information;
   determining resources to use to send the ACK NACK signal based at least on a current one of multiple allocated physical uplink control channel formats, wherein the determining resources uses different information to determine the resources for different ones of the multiple allocated physical uplink control channel formats; and
   transmit said ACK/NACK signal to said base station on the determined resources.

15. An apparatus as claimed in claim 14, wherein the at least one memory and the computer code are configured, with the at least one processor, to cause the apparatus at least to receive and/or transmit through Media Access Control (MAC) and/or Physical Layer (PRY) signaling.

16. An apparatus as claimed in claim 14, wherein the multiple allocated physical uplink control channel formats are a Physical Uplink Control Channel (PUCCH) format 3 or a PUCCH format 1b with channel selection.

17. An apparatus as claimed in claim 16, wherein:
   the at least one memory and the computer code are configured, with the at least one processor, to cause the apparatus at least to receive said TDD uplink-downlink configuration information in multiple downlink subframes of a radio frame from said base station;
   the at least one memory and the computer code are configured, with the at least one processor, to cause the apparatus at least to generate corresponding ACK NACK signals, in a order of said receiving, indicating success or failure in receiving said TDD uplink-downlink configuration information at said UE; and
   the transmitting comprises transmit transmitting said corresponding ACK/NACK signals, respectively, to said base station using the determined resources.

18. An apparatus as claimed in claim 14, wherein:
   generating the acknowledgement(ACK)/Non-acknowledgement(NACK) signal comprises using ACK/NACK bundling to generate one ACK/NACK bit for said DL subframe;
   determining resources comprises determining the format of the physical uplink channel is a format 1b, and the determining resources further comprises, in response to Physical Downlink Control Channel with assigned PDSCH being detected in a same DL subframe of said signaling message, determining the resources using the information of on implicit PUCCH resource derived by lowest Control Channel Element (CCE) index of Downlink Control Information (DCI) scrambled by Cell Radio Network Temporary Identifier (C-RNTI); and
   transmitting further comprises transmitting said one ACK/NACK bit on the determined resources.

19. An apparatus as claimed in claim 14, wherein the apparatus the at least one memory and the computer code are configured, with the at least one processor, to cause the apparatus at least to receive said signaling message using DL Semi-Persistent Scheduling Activation or Release signaling.

20. An apparatus comprising at least one processor and at least one memory including computer code for one or more programs, the at least one memory and the computer code configured, with the at least one processor, to cause the apparatus at least to:
- dynamically identify TDD uplink-downlink configuration information for a user equipment (UE) that is connected with a base station in a network;
- transmit said TDD uplink-downlink configuration information to said UE, wherein the transmitting transmits the TDD uplink-downlink configuration information in one or more fields of downlink control information (DCI), where the TDD uplink-downlink configuration information occupies one or more special fields in the DCI information meant to contain other information;
- determining resources to use to receive an ACK NACK signal based at least on a current one of multiple allocated physical uplink control channel formats, wherein the determining resources uses different information to determine the resources for different ones of the multiple allocated physical uplink control channel formats, wherein the ACK/NACK signal indicates success or failure in receiving at said UE said TDD uplink-downlink configuration information; and
- receive the ACK/NACK signal over the determined resources.

* * * * *

UNITED STATES PATENT AND TRADEMARK OFFICE
CERTIFICATE OF CORRECTION

PATENT NO. : 10,193,681 B2
APPLICATION NO. : 14/889190
DATED : January 29, 2019
INVENTOR(S) : Haipeng Lei and Chunhai Yao Page 1 of 1

It is certified that error appears in the above-identified patent and that said Letters Patent is hereby corrected as shown below:

In the Claims

In Claim 6: Column 20, Line 26, delete "if"

In Claim 15: Column 22, Line 24, delete "(PRY)" and insert --(PHY)--

In Claim 17: Column 22, Line 41, delete "transmit"

Signed and Sealed this
Seventh Day of May, 2019

Andrei Iancu
*Director of the United States Patent and Trademark Office*